Patented Feb. 16, 1937

2,071,043

UNITED STATES PATENT OFFICE 2,071,043

ORAL PREPARATION

Ferdinand W. Nitardy, Brooklyn, N. Y., assignor to E. R. Squibb & Sons, New York, N. Y., a corporation of New York No Drawing. Application September 8, 1934, Serial No. 743,182

2 Claims. (Cl. 167—93)

This invention relates to oral preparations, particularly to such as contain sodium perborate.

Preparations containing sodium perborate have been found to be useful in oral hygiene, but they have hitherto suffered from the defect that the sodium perborate, even if partially dehydrated, tends, especially during summer heat, to undergo liquefaction and caking, accompanied by decomposition.

It is the object of this invention to provide preparations containing sodium perborate so stabilized as to eliminate or minimize this tendency.

In the practice of this invention the stabilization of preparations containing sodium perborate, whether crystalline, anhydrous, or partially dehydrated, is effected by adding magnesium hydroxide. A small proportion of the magnesium hydroxide will suffice to accomplish this stabilization, but more of it may of course be employed in order to contribute its own therapeutic properties to the preparation.

For example, an oral preparation comprising fifty parts of sodium perborate mixed with one part of magnesium hydroxide, and any desired flavor, is found to be stable, even under elevated temperatures, for long periods of time. A suitably larger proportion of magnesium hydroxide would give rise to the further advantage of making the preparation antacid.

It is to be understood that the foregoing examples are merely illustrative and by no means limitative of the invention, which may be variously otherwise embodied within the scope of the appended claims.

I claim:
1. In an oral preparation, sodium perborate and at least enough magnesium hydroxide to stabilize the sodium perborate.
2. Sodium perborate stabilized by means of magnesium hydroxide.

FERDINAND W. NITARDY.